United States Patent [19]

Pomot

[11] 4,064,073

[45] Dec. 20, 1977

[54] CATALYST FOR THE PURIFICATION OF THE EXHAUST GASES OF INTERNAL COMBUSTION ENGINES

[75] Inventor: Jean Louis Emile Pomot, Mouans Sartoux, France

[73] Assignee: Societe Francaise d'Oxycatalyse, France

[21] Appl. No.: 640,280

[22] Filed: Dec. 12, 1975

[30] Foreign Application Priority Data

Dec. 13, 1974 France ............................... 74.41145

[51] Int. Cl.² .................. B01J 21/04; B01J 23/64; B01J 23/86
[52] U.S. Cl. .................................. 252/465; 252/470; 423/213.5
[58] Field of Search .................... 252/465, 466 B, 470, 252/472; 423/213.2, 213.5, 213.7

[56] References Cited

U.S. PATENT DOCUMENTS

| | | | |
|---|---|---|---|
| 3,649,706 | 3/1972 | Lester | 252/465 X |
| 3,839,224 | 10/1974 | Yonehara et al. | 252/465 X |
| 3,873,471 | 3/1975 | Koberstein et al. | 252/465 |
| 3,881,696 | 5/1975 | Lepeytre et al. | 252/465 X |

*Primary Examiner*—W. J. Shine
*Attorney, Agent, or Firm*—Stevens, Davis, Miller & Mosher

[57] ABSTRACT

New catalysts are described which are useful over a wide temperature range for purifying exhaust gases from internal combustion engines burning gasoline. The new catalysts are of composite form comprising a water-gas type catalyst and at least one platinum group metal such as platinum, palladium or ruthenium. As water-gas catalyst, use can be made of a mixture or iron oxide and chromium oxide. By using such composite catalysts on a common refractory substrate, nitrogen oxides, carbon monoxide and unburnt hydrocarbons can be removed to a substantial degree in a single stage.

9 Claims, No Drawings

CATALYST FOR THE PURIFICATION OF THE EXHAUST GASES OF INTERNAL COMBUSTION ENGINES

The invention relates to the catalytic purification of the exhaust gases from internal combustion engines using gasoline, with a view to eliminating carbon monoxide, unburnt hydrocarbons and nitrogen oxides ($NO_x$) in the exhaust gases.

Various catalytic methods have already been proposed for purifying the exhaust gases of internal combustion engines. Most are based on the use of two different catalysts in two purifiers disposed in series along the engine exhaust manifold. In these methods, the exhaust gases first travel through a first catalyst, which is adapted to reduce the nitrogen oxides with the carbon monoxide present in the gas. Next, air is added to the exhaust gases via a venturi system or a pump, after which the gases travel through a second or oxidation catalyst which converts the carbon monoxide and unburnt hydrocarbons into carbon dioxide and water.

These methods all have the following serious disadvantages:
1. The reduction of nitrogen oxides ($NO_x$) on the first catalyst bed can occur with acceptable efficiency only if the exhaust gases are strongly reducing, but this can be obtained only by supplying the engine with a rich mixture, i.e. at an air/petrol ratio below 14, the stoichiometric ratio being approx. 14.6. If the engine is operated in this manner, there is a considerable increase in petrol consumption.
2. Most reduction catalysts recommended for reducing $NO_x$ in the first catalyst bed convert a relatively large proportion of nitrogen oxides into ammonia. When the ammonia travels over the oxidation catalyst it is oxidized and produces more nitrogen oxides, thus reducing the efficiency of the process with regard to the final elimination of nitrogen oxides.
3. The various catalysts recommended for reducing $NO_x$ are efficient only at relatively high temperatures, usually above 500°. As a result, the time taken to reach this temperature after the engine starts is too long to obtain efficient purification during the first minutes of operation, and the catalyst substrates have to preserve their physical and mechanical properties at high temperatures.
4. It is relatively expensive to use two purification reactors containing two different catalysts and a device for injecting air between the two purifiers.

Many attempts have already been made to purify the exhaust gases of internal combustion engines by sending them through a purifier containing a single catalyst which can simultaneously eliminate carbon monoxide, unburnt hydrocarbons and nitrogen oxides. It has been found inter alia that some platinum-based catalysts can partly eliminate nitrogen oxides at the same time as carbon monoxide and unburnt hydrocarbons, provided that the fuel/air supplied to the engine is kept near the stoichiometric ratio. These catalysts, however, have three major disadvantages which limit their use under practical conditions. Firstly, they do not reduce nitrogen oxides selectively except at temperatures below 200° C, i.e. appreciably below that of the exhaust gases, and furthermore the proportion reduced does not exceed 80%. Secondly, they tend to form ammonia by reducing nitrogen oxides when the gas contains a low proportion of oxygen. Finally, like most platinum catalysts, they are rapidly poisoned by sulphur (even in small proportions) in the gasoline.

The applicants have now found, according to the present invention, that if the exhaust gases from an internal combustion engine using gasoline supplied continuously and near the stoichiometric ratio are contacted with one or more noble metals as hereafter specified, associated with a catalyst producing water-gas, the metal(s) and catalyst being deposited on a suitable substrate, preferably an alumina substrate, nitrogen oxides, carbon monoxide and unburnt hydrocarbons can be eliminated in a single operation in a proportion of at least 90%, when the exhaust gas temperature is between 250° and 600° C.

According to the present invention there is provided a method of catalytic purification of the exhaust gases of an internal combustion engine fed with air and gasoline in a ratio near the stoichiometric ratio, characterised in that the exhaust brought into contact with a mixed catalyst comprising (a) a catalyst producing water gas and (b) at least one noble metal of the platinum group of metals, (a) and (b) being on the same substrate.

Thus, this invention provides a method of preparing a catalyst suitable for purifying exhaust gases from an internal combustion engine using gasoline, which method essentially comprises the steps of providing a porous substrate, impregnating such substrate with an aqueous solution or iron and chromium salts adapted to form a deposit comprising an intimate mixture of iron oxide and chromium oxide in the pores of the substrate, subsequently impregnating the substrate with a solution of at least one platinum group metal salt which dissociates when hot, and finally subjecting the impregnated substrate to a baking treatment in a reducing atmosphere.

The present invention also includes new catalysts as such. Thus the invention includes a catalyst for purifying exhaust gases from an internal combustion engine using gasoline, chracterised in that it comprises a substrate bearing a water-gas catalyst and at least one noble metal of the platinum group of metals.

In the most important embodiments of the invention, the noble metal catalyst is located on top of the water-gas catalyst.

Exhaust gases can be purified to a very high degree by means of catalysts according to the invention in the event that the internal combustion engine is fuelled so that the air/gasoline ratio is very near the stoichiometric ratio, i.e. between 14.5 and 14.7 for gasoline for which the air/gasoline stoichiometric ratio is 14.6. when the engine is supplied under these conditions, the exhaust gases contain a percentage by volume of oxygen which is substantially equal to the percentage of carbon monoxide. By way of example, the average composition by volume of an exhaust gas of the aforementioned kind is given in the following table:

| | | | | |
|---|---|---|---|---|
| $O_2$ | 0.5 | ± | 0.1 | % |
| CO | 0.5 | ± | 0.1 | % |
| CH (hydrocarbons) | 0.03 | ± | 0.01 | % |
| $H_2$ | 0.2 | ± | 0.1 | % |
| $NO_x$ | 0.15 | to | 0.3 | % |
| $H_2O$ | | | 12.5 | % |
| $CO_2$ | | | 13 | % |
| $N_2$ | to make up to | | 100 | % |

Depending on the design of the engine, if the supply is near the stoichiometric ratio, the percentages of oxygen and carbon monoxide may be greater than 0.5% by volume, up to 1%, while remaining substantially equal.

The catalysts according to the invention can be defined by the formula:

$$S + C + M$$

wherein S is a porous substrate, e.g. an alumina substrate, C is a conversion catalyst tending to displace the reaction $CO + H_2O \rightleftarrows CO_2 + H_2$ towards the right and M is a noble metal or mixture of noble metals of the platinum group.

For the catalyst substrate, use can be made of any porous refractory substrate structure S designed to provide the gas with a maximum contact surface with respect to the volume of the catalyst bed while reducing the pressure drop to a minimum.

For example, the substrate S can comprise spherical alumina particles between 1 and 10 mm, preferably 2-5 mm, in diameter, or alumina rods between 2 and 8 mm long and 1 and 2 mm in diameter; the porosity, defined by the volume of water adsorbable by 100 g of the particles or rods, is between 30 and 70%, preferably between 60 and 65%, and the specific surface (the total pore area) is between 200 and 300 m²/g, and is preferably near 250 m²/g.

Alternatively, the substrate S can be a monolithic block of alumina formed with a number of channels having diameters between 2.5 and 2.8 mm, the block having a porosity between 35 and 45%, an expanded surface (= internal area of channels) between 0.8 and 1 m²/g and a specific surface between 40 and 90 m²/g.

The particles and rods used can be those manufactured by the Societe Pechiney Progil and the monolithic blocks can be those manufactured under the trade mark "Annawerk" by the German Company styled Keramische Betriebe G.m.b.H.

The conversion catalyst C can be a mixture of iron oxide and chromium oxide containing between 80 and 95% iron oxide and between 5 and 15% chromium oxide, preferably between 86 and 90% iron oxide and 10-14% chromium oxide.

In the preferred method of preparing catalysts according to the invention, the substrate S is first impregnated with the conversion catalyst C defined hereinbefore. Impregnation can be by various known methods.

For example, the substrate can first be impregnated by immersion for 15-30 minutes in a solution containing iron nitrate and chromic acid in the desired proportions, a wetting agent which is stable in an acid medium being preferably added to the immersion solution so as to reduce interface tensions. Next, the substrate is dried by heating to 110°-120° C, then maintained at a temperature between 400° and 500° C in a reducing atmosphere for 4-6 hours. The substrate may also be impregnated with a solution of ferrous sulphate and ammonium bichromate in the desired proportions, after which the substrate is treated in a stream of ammonia, dried at 150°-200° C for 2-4 hours and then kept at 580°-600° C for 2 hours.

The substrate S is impregnated with 5-15%, preferably 9-12% by weight of conversion catalyst C, comprising an intimate mixture of iron oxide and chromium oxide.

In catalysts according to the invention, the conversion catalyst deposited firstly on the substrate has the following three functions:

1. It converts most of the CO in the gases to be purified into $CO_2$, by tending to displace the reaction: $CO + H_2O \rightleftarrows CO_2 + H_2$ towards the right, with production of hydrogen.

2. In an oxidising atmosphere, it stabilises certain noble metals (M in the formula given earlier) such a ruthenium, which are adapted to form volatile oxides at the exhaust-gas temperature, the stabilisation resulting from the reaction between the iron and chromium oxides and ruthenium oxide, producing compounds which are catalytically active and thermally stable.

3. The iron oxide bearing the noble metal or metals preferentially absorbs the combustion products of any sulphur derivatives in the gasoline, thus considerably increasing the working life of the catalyst and preventing the noble metals from being rapidly poisoned.

To simplify the description, the substrate impregnated with the conversion catalyst C in the aforementioned manner will hereinafter be called S + C. The substrate S + C is processed by depositing one or more noble metals from the platinum group on the surface of the mass of iron oxide and chromium oxide. Use can be made e.g. of platinum alone, palladium alone, ruthenium alone or binary mixtures such as platinum + palladium, platinum + ruthenium, palladium + ruthenium or a ternary mixture, i.e. platinum + palladium + ruthenium.

As is known, platinum deposited on an alumina substrate can reduce nitrogen oxides and simultaneously oxidise carbon monoxide and hydrocarbons when the exhaust-gas composition corresponds to a fuel supply near the stoichiometric ratio, i.e. when the oxygen content is substantially equal to the carbon monoxide content. Under these conditions, however, nitrogen oxides are not reduced except at temperatures far below the normal exhaust-gas temperatures, and furthermore most (up to 90%) of the nitrogen oxides are converted to ammonia. The percentage of nitrogen oxides converted to ammonia is acceptable only if the oxygen content is appreciably higher than the carbon monoxide content, i.e. if the air/petrol ratio is at least 15 and the temperature does not exceed 250° C, in which case the percentage of reduced nitrogen oxides is very low.

The applicants have found, however, that when platinum or palladium are used according to the invention in conjunction with the conversion catalyst C, the amount of ammonia formed when the engine is supplied at near the stoichiometric ratio is greatly reduced and rarely exceeds 30% with respect to the nitrogen oxides in the exhaust gases. The applicants have also found that if a certain quantity of ruthenium is added to the platinum or palladium or to the mixture of platinum and palladium, it practically eliminates the formation of ammonia by the reaction between hydrogen and the nitrogen oxides. Percentages of ruthenium between 5 and 50%, preferably between 20 and 50% with respect to the platinum or palladium or to the mixture of the two are sufficient to reduce the formation of ammonia so much that the percentage of nitrogen oxides converted to ammonia does not exceed 1%.

Accordingly, a catalyst composition containing ruthenium is preferred for working the invention.

The substrate S + C is impregnated with the noble metal or metals M, either by immersing the substrate in an aqueous solution of the salt or salts of the metals which are to be deposited, or by spraying the solution. In the case of deposition by immersion, the concentration of salts of the metals to be deposited is calculated in dependence on the porosity of the substrate S + C, which of course is less than that of the original substrate S. In the case of deposition by spraying, which is applicable only when the substrate S is made of alumina particles or rods, the substrate is placed in a sealed, agitated chamber and sprayed with a volume of solution corresponding to the porosity of the substrate, the concentration of salts corresponding exactly to the quantity of metal or metals which are to be deposited.

The following salts of noble metals of group VIII are preferably used: chloroplatinic acid $H_2PtCl_6$, palladium chloride $PdCl_2$ and ruthenium chloride $RuCl_4.5H_2O$.

In accordance with one aspect of the invention, the catalyst component (b) is present in a proportion between 0.05 and 0.3% with respect to the sum of the weight of the porous substrate and catalyst component (a).

In the case of a catalyst S + C + Pt, the quantity of platinum used alone can be between 0.05 and 0.3%, preferably between 0.1 and 0.15% with respect to the weight of the substrate S + C.

In the case of a catalyst S + C + Pd, the quantity of palladium used alone can be, as in the case of platinum, between 0.05 and 0.3%, preferably between 0.1 and 0.15% with respect to the weight of the substrate S + C.

In the case of a catalyst S + C + Pt + Pd, the total quantity of the two metals can be between 0.05 and 0.3%, preferably between 0.1 and 0.15% with respect to the weight of the substrate S + C. The proportions of platinum and palladium respectively can be between 1 and 99%, but preferably the two metals are used in equal proportions.

In the case of a catalyst S + C + Pt + Ru or a catalyst S + C + Pd + Ru, the quantity of platinum or palladium can be between 0.05 and 0.15%, the quantity of ruthenium being between 0.01 and 0.05% with respect to the weight of the substrate S + C.

In the case of a catalyst S + C + Pt + Pd + Ru the total quantity of platinum and palladium can be between 0.05 and 0.15%, the quantity of ruthenium alone being between 0.01 and 0.05% with respect to the weight of the substrate S + C.

The substrate, after being impregnated by immersion or by spraying with the solution of the noble-metal salt or salts, is dried at 110–120° C for an hour. The catalyst S + C + M is then placed in a baking furnace in a reducing atmosphere containing e.g. 1–5% of CO or $H_2$ and progressively brought to a temperature between 400° and 500° C, the temperature being maintained for 4 or 5 hours. The catalyst is cooled to room temperature and is then ready for use.

Catalysts according to the invention have some efficiency even at temperatures near 200° C. They reach maximum efficiency, however, at approx. 350° C, and retain it at temperatures between 350° and 600° C. The best results for the elimination of both nitrogen oxides and carbon monoxide and hydrocarbons are obtained at temperatures between 350° and 400° C. For this reason, the purification reactor is advantageously disposed at a distance from the engine exhaust manifold such that the exhaust gases are within the aforementioned temperature interval.

The catalysts according to the invention can be subjected to a strongly oxidising atmosphere at an elevated temperature for a relatively long time without adversely affecting their ability to reduce nitrogen oxides and simultaneously oxidise carbon monoxide and hydrocarbons, when the composition of the exhaust gases again corresponds to a fuel supply near the stoichiometric ratio. Because of this resistance to oxidation, the catalyst can inter alia be rapidly re-heated when the engine starts, by pumping a quantity of additional air into the purification reactor, the additional air being cut off automatically when the temperature in the catalyst reaches 250°–300° C.

The following non-limitative examples are given to illustrate the invention. They describe experiments with a gas corresponding to operation of a petrol engine supplied with fuel at approximately the stoichiometric ratio, i.e. with an air/gasoline ratio of 14.6, the average composition being as follows:

| | | | | |
|---|---|---|---|---|
| CO | | | 0.5 | % |
| $H_2$ | 0.2 | to | 0.25 | % |
| CH | 0.025 | to | 0.03 | % |
| $NO_x$ | 0.25 | to | 0.3 | % |
| $O_2$ | 0.4 | to | 0.6 | % |
| $H_2O$ | | approx. | 12 | % |
| $CO_2$ | | approx. | 13 | % |
| $N_2$ | | to make up to | 100 | % |

To simplify the description, a gas of this kind will hereinafter be called "gas G."

EXAMPLE 1

Alumina particles having a diameter between 3 and 5 mm a porosity of 62.5% and a specific surface of 260 $m^2/g$ were impregnated by immersion for 30 minutes in a cold aqueous solution of ferric nitrate and chromic acid containing 601.6 g of $Fe(NO_3)_3$, 6 $H_2O$, 29.6 g of $CrO_3$ and 2 ml of 1% solution of FC 170 wetting agent made by Societe 3M, per liter. After centrifuging, the alumina particles were dried at 120° C for 1 hour. They were then baked in a furnace in a stream of reducing gas containing 1% carbon monoxide. The temperature was raised from 120° to 450° C in 2 hours and maintained at 450° C for 4 hours, after which the alumina was cooled to ambient temperature.

In this manner, the alumina particles were charged with an intimate mixture of 8.5 iron oxide and 1.4 g chrominum oxide $Cr_2O_3$ per 100 g of starting substrate, so that the substrate S + C contained 7.8% iron oxide and 1.27% chromium oxide. A porosity measurement showed that the porosity of the support S + C was 54%.

EXAMPLE 2

The particles of support S + C prepared in Example 1 were immersed for 30 minutes in an aqueous solution of chloroplatinic acid containing 5.9 g $PtCl_6H_2$ and 2 ml of a 1% solution of FC 170 wetting agent per litre. After draining, the particles were dried at 120° C for 1 hour. They were baked and reduced in a furnace in a stream of reducing gas containing 1% CO. The temperature was progressively raised to 450° C and maintained at that value for 4 hours, followed by cooling to room temperature still in a reducing atmosphere. The thus-prepared catalyst contained 7.8% iron oxide, 1.27% chromium oxide and 0.15% platinum.

The catalyst was tested by conveying gas G at a temperature of 370° C and a spatial velocity of 16 000 over the catalyst bed. The efficiency, measured as the percentage of harmful products eliminated, was 75% for $NO_x$, 90% for CO and 92% for hydrocarbons. When the speed was doubled, the efficiency was 72% for $NO_x$, 85% for CO and 90% for hydrocarbons. On average, however, 13.2% of $NO_x$ was found in the form of ammonia at the purifier outlet.

EXAMPLE 3

Particles of the substrate S + C prepared according to Example 1 were immersed for 30 minutes in an aqueous solution of palladium chloride containing 4.6 g $PdCl_2$ and 2 ml of 1% solution of FC 170 wetting agent per liter. After draining, the particles were processed by the method described in Example 2. The thus-prepared catalyst contained 7.8% iron oxide, 1.27% chromium oxide and 0.15% palladium.

The catalyst was tested by conveying gas G at a temperature of 375° C and a spatial velocity of 16 000 over the catalyst bed. The efficiency, measured as the percentage of harmful products eliminated, was 85.6% for $NO_x$, 90% for CO and 90.5% for the hydrocarbons. However, 25.2% on average of $NO_x$ was found in the form of ammonia at the purifier outlet.

EXAMPLE 4

The particles of S + C substrate prepared according to Example 1 were immersed for 30 minutes in an aqueous solution of chloroplatinic acid and palladium chloride containing 3 g $PtCl_6H_2$, 2.3 g $PdCl_2$ and 2 ml of a 1% solution of FC 170 wetting agent per litre. After draining, the particles were processed by the method described in Example 2. The thus-prepared catalyst contained 7.8% iron oxide, 1.27% chromium oxide, 0.075% platinum and 0.075% palladium.

The catalyst was tested by conveying gas G at a temperature of 380° C and a spatial velocity of 16 000 over the catalyst bed. The efficiency, evaluated as in the preceding examples, was 86.5% for $NO_x$, 92.3% for CO and 100% for hydrocarbons. However, 24.8% on average of $NO_x$ was found in the form of ammonia at the purifier outlet.

EXAMPLE 5

Particles of substrate S + C prepared as in Example 1 were immersed for 30 minutes in an aqueous solution of chloroplatinic acid and ruthenium chloride containing 3.9 g $PtCl_6H_2$, 3.05 g $RuCl_4$, $5H_2O$ and 2 ml of a 1% solution of FC 170 wetting agent per liter. After draining, the particles were treated by the method described in Example 2. The thus-prepared catalyst contained 7.8% iron oxide, 1.27% chromium oxide, 0.1% platinum and 0.05% ruthenium.

The catalyst was tested by conveying gas G at a temperature of 375° C and a spatial velocity of 16 000 over the catalyst bed. The efficiency, evaluated as in the preceding Examples, was 98% for $NO_x$, 92% for CO and 100% for hydrocarbons. No trace of ammonia was detected at the purifier outlet.

EXAMPLE 6

Particles of substrate S + C prepared as in Example 1 were immersed for 30 minutes in an aqueous solution of palladium chloride and ruthenium chloride containing 3 g $PdCl_2$, 0.6 g $RuCl_4$, $5H_2O$ and 2 ml of a 1% solution of FC 170 wetting agent per litre. The particles were dried and processed in a reducing furnace as in the preceding Examples.

The catalyst contained 7.8% iron oxide, 1.27% chromium oxide, 0.1% palladium and 0.01% ruthenium. It was tested by conveying gas G at a temperature of 380° C and a spatial velocity of 16 000 over the catalyst bed. The efficiency was 96.2% for $NO_x$, 94% for CO and 99% for hydrocarbons. The ammonia at the purifier outlet was determined, showing that only 0.1% of the $NO_x$ in the gas was converted to ammonia.

EXAMPLE 7

The catalyst described in Example 6 was tested as follows:

3.5% CO and 20% air was added to gas G so as to make it strongly oxidising. The gas was heated to 200° C and travelled across the catalyst bed at a spatial velocity of 20 000. The temperature in the catalyst bed reached 300° C in a few minutes. Next, the supply of CO and supplementary air were cut off so as to bring gas G to its initial composition, corresponding to a stoichiometric engine supply, and the catalyst was tested for 3 hours in the manner described in the preceding Examples. Next, the gas supply was stopped and the catalyst was cooled. This test represents a complete cycle — i.e. cold-starting of the engine, rapid re-heating of the catalyst by injecting supplementary air, normal operation for 3 hours and stopping.

The cycle was repeated 50 times in succession, corresponding to 155 hours of operation. At the end of the 50th cycle, the gases were analyzed at the inlet and outlet of the purifier. It was found that the efficiency was practically the same as for new catalyst — i.e. 92% for $NO_x$, 95% for CO and 90% for hydrocarbons. As before, no $NH_3$ formed.

This example shows the high resistance of the catalyst to oxidation and the great stability of ruthenium when combined with iron oxide and chromium oxide.

EXAMPLE 8

The catalyst described in Example 5 was placed in a closed chamber and subjected to a stream of $SO_2$ at a temperature of 400° C for 8 hours. After this treatment, the catalyst was again tested by conveying gas G at a temperature of 375° C and a spatial velocity of 16 000 over the catalyst bed. During the first 2 hours of operation, an appreciable amount of $SO_2$ was liberated. During these two first hours, the efficiency was 99% for $NO_x$, 87.5% for CO and 89% for hydrocarbons, and this efficiency was maintained during subsequent hours.

EXAMPLE 9

The substrate used was a block of "Annawerk" alumina, reference AL 0001, manufactured by the German company Keramische Betriebe G.m.b.H.. The block had a hexagonal cross-section, each side being 27 mm, and a height of 100 mm. It was formed with 169 channels 2.6 mm in diameter in the vertical direction. Its porosity was 40% and its specific surface was 85 m²/g.

The block was impregnated by immersion for 30 minutes in an aqueous solution of ferric nitrate and chromic acid containing 931 g of $Fe(NO_3)^3$, $6H_2O$, 46 g $CrO_3$ and 2 ml of 1% solution of FC 170 wetting agent per liter. After draining, the block was dried for an hour at 120° C and then placed in a furnace in a stream of reducing gas containing 1% carbon monoxide. In 2 hours, the temperature was raised from 120° to 450° C, at which it was maintained for 4 hours, followed by cooling to ambient temperature.

In this manner, the alumina block was impregnated with an intimate mixture of 8.5 g iron oxide and 1.4 g chromium oxide $Cr_2O_3$ per 100 g substrate. The thus-prepared substrate S + C contained by weight 7.8% iron oxide and 1.27% chromium oxide. After this first impregnation, the substrate S + C had a porosity of 35%.

Next, the block was immersed for 30 minutes in an aqueous solution of palladium chloride and ruthenium chloride containing 4.75 g $PdCl_2$, 4.7 g $RuCl_4$, $5H_2O$ and 2 ml of a 1% solution of FC 170 wetting agent per liter. Next, the block was drained, dried at 120° C and then maintained at 450° C for 4 hours in a reducing atmosphere, followed by cooling in a reducing atmosphere to room temperature.

The thus-prepared monolithic catalyst contained the substrate plus 7.8% iron oxide intimately alloyed with 1.27% chromium oxide, forming a complex which in turn was covered with a mixture of 0.1% palladium and 0.05% ruthenium. It was tested by conveying gas G at a temperature of 370°–375° C and a spatial velocity of 16 000 through the channels in the block. 100% of the nitrogen oxides, 98% of the carbon monoxide and 96% of the hydrocarbons were eliminated. Ammonia was determined at the purifier outlet, showing that only 0.6% of the nitrogen oxides in the gas were reduced to ammonia.

I claim:

1. A pollution removing catalytic complex for exhaust gases of gasoline-operated internal-combustion engines and like gases containing unburnt hydrocarbons, oxygen, carbon monoxide, at least one oxide of nitrogen and water vapor, said catalytic complex comprising an intimate admixture on a porous substrate designed to be fitted in the path of said exhaust gases, said intimate admixture consisting essentially of:
   a. a first catalyst component suitable for liberating hydrogen through the reaction of carbon monoxide and water, said first catalyst component consisting essentially of a mixture of iron oxide and a chromium oxide; and
   b. a second catalyst component capable of catalyzing the reaction of the thus-liberated hydrogen with oxides of nitrogen, said second catalyst component being carried on the surface of said first catalyst component and consisting essentially of ruthenium and at least one of the metals platinum and palladium.

2. A catalyst according to claim 1, wherein the catalyst component (b) is present in a proportion between 0.05 and 0.15% with respect to the sum of the weight of the porous substrate and catalyst component (a).

3. A catalyst according to claim 1, wherein the catalyst component (b) is ruthenium which is present in a proportion between 0.01 and 0.05% with respect of the sum of the weight of the porous substrate and the catalyst component (a).

4. A catalyst according to claim 1, wherein said substrate comprises at least one monolithic block of alumina having a plurality of channels with a diameter of a few millimetres, said block having a porosity between 35 and 45%, an expanded surface of between 0.8 and 1 $m^2/g$ and a specific surface between 40 and 90 $m^2/g$.

5. A catalyst according to claim 1 wherein the iron oxide and chromium oxide together are present in a proportion of 5 – 15% based on the weight of the porous substrate.

6. A catalyst of claim 1 wherein said porous substrate is chemically inert alumina.

7. A catalyst of claim 1, wherein said first component contains 80 to 95% iron oxide.

8. A catalyst of claim 1, wherein said first component contains 86 to 90% iron oxide.

9. A catalytic complex of claim 6, wherein said porous alumina substrate presents a porosity between 30 and 70% and a specific surface between 200 and 300 $m^2/g$.

* * * * *